United States Patent
Roskind et al.

(10) Patent No.: US 9,083,583 B1
(45) Date of Patent: *Jul. 14, 2015

(54) LATENCY REDUCTION VIA ADAPTIVE SPECULATIVE PRECONNECTION

(75) Inventors: James Roskind, Redwood City, CA (US); Michael Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/175,715

(22) Filed: Jul. 1, 2011

(51) Int. Cl.
*G06F 15/16* (2006.01)
*H04L 29/08* (2006.01)

(52) U.S. Cl.
CPC .................................. *H04L 29/0809* (2013.01)

(58) Field of Classification Search
CPC ....................................................... H04L 29/00
USPC ........................... 709/217, 219, 227, 228, 229
See application file for complete search history.

(56) References Cited

U.S. PATENT DOCUMENTS

| | | | |
|---|---|---|---|
| 6,023,726 A | 2/2000 | Saksena | |
| 6,041,357 A | 3/2000 | Kunzelman et al. | |
| 6,055,572 A | 4/2000 | Saksena | |
| 6,067,565 A | 5/2000 | Horvitz | |
| 6,085,226 A | 7/2000 | Horvitz | |
| 6,182,133 B1 | 1/2001 | Horvitz | |
| 6,366,947 B1 | 4/2002 | Kavner | |
| 6,604,103 B1 | 8/2003 | Wolfe | |
| 6,757,738 B1 * | 6/2004 | Cao et al. ....................... | 709/233 |
| 7,024,466 B2 * | 4/2006 | Outten et al. .................. | 709/219 |
| 7,047,485 B1 | 5/2006 | Klein et al. | |
| 7,103,594 B1 | 9/2006 | Wolfe | |
| 7,113,935 B2 | 9/2006 | Saxena | |
| 7,302,465 B2 | 11/2007 | Ayres et al. | |
| 7,437,438 B2 | 10/2008 | Mogul et al. | |
| 7,483,941 B2 | 1/2009 | Carlson et al. | |
| 7,558,748 B2 | 7/2009 | Ehring et al. | |
| 7,584,500 B2 | 9/2009 | Dillon et al. | |
| 7,716,332 B1 | 5/2010 | Topfl et al. | |
| 7,747,749 B1 | 6/2010 | Erikson et al. | |
| 7,908,336 B2 | 3/2011 | Carlson et al. | |
| 7,921,117 B2 | 4/2011 | Saxena | |
| 7,941,609 B2 | 5/2011 | Almog | |

(Continued)

OTHER PUBLICATIONS

U.S. Appl. No. 14/529,301, "Reduction in Redirect Navigation Latency via Speculative Preconnection," to James Roskind, filed Oct. 31, 2014.

*Primary Examiner* — Viet Vu
*Assistant Examiner* — Keyvan Emdadi
(74) *Attorney, Agent, or Firm* — Sterne, Kessler, Goldstein & Fox PLLC

(57) ABSTRACT

Methods, systems, and computer program products for reducing web latency using adaptive speculative preconnection are provided. Exemplary methods, systems, and computer program products for reducing web latency include initiating a connection to a first URL hostname, and obtaining speculative information associated with the first URL hostname. The speculative information includes a likelihood of connecting to a second URL hostname as a result of initiating a connection to the first URL hostname. The methods, systems, and computer program products also include determining whether to preconnect to the second URL hostname based on the speculative information. The methods, systems, and computer program products further include providing an instruction to preconnect to the second URL hostname when a determination to preconnect is made.

23 Claims, 4 Drawing Sheets

(56) References Cited

U.S. PATENT DOCUMENTS

| | | |
|---|---|---|
| 7,975,025 B1 | 7/2011 | Szabo et al. |
| 7,987,431 B2 | 7/2011 | Santoro et al. |
| 8,341,245 B1 | 12/2012 | Roskind et al. |
| 8,903,946 B1 | 12/2014 | Roskind |
| 2002/0111967 A1 | 8/2002 | Nagase |
| 2004/0003287 A1* | 1/2004 | Zissimopoulos et al. ..... 713/201 |
| 2005/0065870 A1* | 3/2005 | Yu ................................ 705/37 |
| 2005/0102394 A1* | 5/2005 | Loveland ..................... 709/224 |
| 2006/0036966 A1 | 2/2006 | Yevdayev |
| 2009/0031040 A1* | 1/2009 | Jayawardena et al. ........ 709/242 |
| 2009/0112975 A1 | 4/2009 | Beckman et al. |
| 2009/0228438 A1 | 9/2009 | Dasgupta et al. |
| 2010/0146415 A1 | 6/2010 | Lepeska |
| 2010/0281224 A1 | 11/2010 | Ho et al. |
| 2011/0134062 A1* | 6/2011 | Chiba et al. .................... 345/173 |
| 2011/0191342 A1* | 8/2011 | Cohen et al. ................... 707/737 |
| 2011/0276561 A1 | 11/2011 | Dulitz et al. |
| 2011/0320518 A1 | 12/2011 | Tsui et al. |
| 2012/0323838 A1* | 12/2012 | Ulinski et al. .................. 706/52 |

* cited by examiner

100
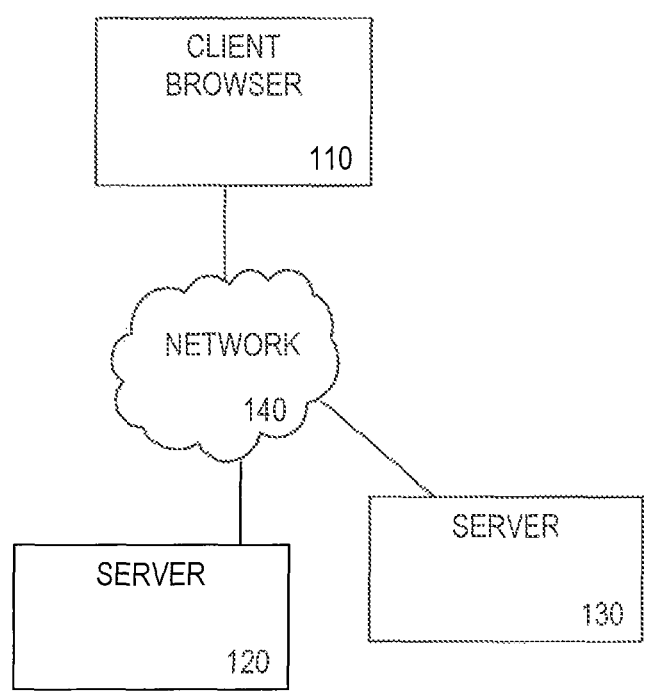
FIG. 1

300

| Host for Page | Page Load Count | Subresource Navigations | Subresource Preconnects | Expected Connects | Subresource Spec |
|---|---|---|---|---|---|
| http://www.cnn.com/ | 2 | 67 | 1 | 15.613 | http://i.cdn.turner.com/ |
| | | 33 | 1 | 7.405 | http://i2.cdn.turner.com/ |
| | | 5 | 0 | 1.700 | http://ds.serving-sys.com/ |
| | | 1 | 0 | 0.340 | http://svcs.cnn.com/ |
| http://ads.cnn.com | 2 | 7 | 0 | 2.380 | http://ads.cnn.com/ |
| | | 1 | 0 | 0.340 | http://content.pulse360.com/ |
| | | 9 | 0 | 2.944 | http://i.cdn.turner.com/ |
| http://svcs.cnn.com/ | 1 | 0 | 0 | 0.340 | http://i.cdn.turner.com/ |
| http://ds.serving-sys.com/ | 1 | 1 | 0 | 0.340 | http://ds.serving-sys.com/ |

LATENCY REDUCTION VIA ADAPTIVE SPECULATIVE PRECONNECTION

BACKGROUND

Background Art

The time it takes a web page to load may be unsatisfactory for a user.

Previous solutions to address web latency have included preresolving host names and prefetching content of a web page. Despite these solutions, user-perceived latency may still be unsatisfactory.

BRIEF SUMMARY

This disclosure relates to methods, systems, and computer program products for reducing web latency using adaptive speculative preconnection. Exemplary methods, systems, and computer program products for reducing web latency include initiating a connection to a first URL hostname, and obtaining speculative information associated with the first URL hostname. The speculative information includes a likelihood of connecting to a second URL hostname as a result of initiating a connection to the first URL hostname. The methods, systems, and computer program products also include determining whether to preconnect to the second URL hostname based on the speculative information. The methods, systems, and computer program products further include providing an instruction to preconnect to the second URL hostname when a determination to preconnect is made.

Further features and advantages of this invention described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 1 shows an illustration of an exemplary communication system in which embodiments can be implemented.

FIG. 3 shows an exemplary table in a speculative database.

DETAILED DESCRIPTION

Figure 2:
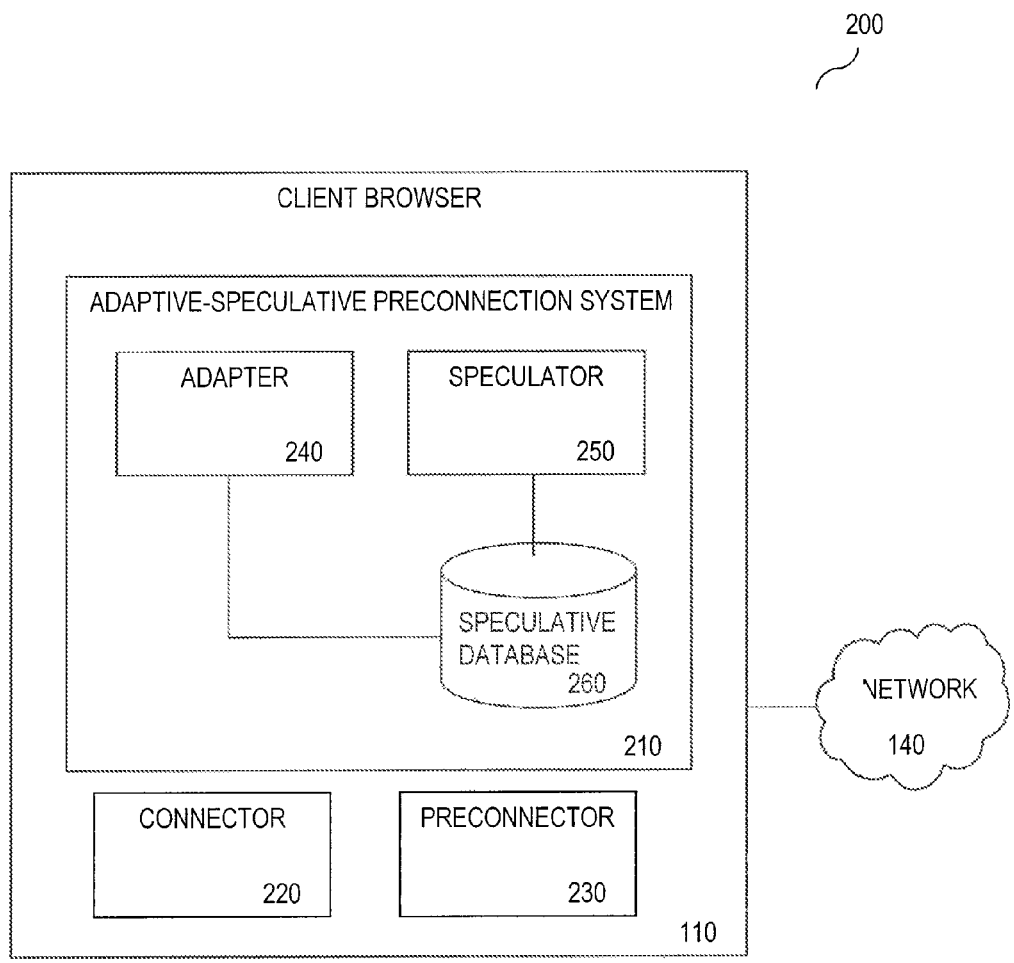
FIG. 2 shows a block diagram of an exemplary computer system.

I. Overview
II. Exemplary System Architecture
III. Exemplary Client Browser
  A. Connections
  B. Adaptive-Speculative Preconnection System
    1. Speculative Information May Be Obtained
    2. Speculative Information May Be Based on Estimates
    3. Speculative Information May Take Path Names Into Consideration
    4. Automatic Preconnections to a Hostname
  C. Preconnections IV. Exemplary Table in Speculative Database
V. Exemplary Method

I. Overview

This description generally relates to network communication. A client application observes a connection being made to a first hostname to acquire a resource. When content from the first hostname is received, the client determines that a connection to a second hostname is needed. A client application adaptively leans that initiating a connection to a first hostname is typically followed by initiating a connection to a second hostname. The client application preconnects to the second hostname by initiating a connection to the second hostname before the connection is required with complete certainty.

A hostname may refer to the DNS (Domain Name System) resolvable textual name of a host (e.g., www.google.com), a port (e.g., port 80, port 443, or port 5000), or a scheme (e.g., HTTP, HTTPS, or FTP).

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

II. Exemplary System Architecture

FIG. 1 shows an illustration of an exemplary communication system 100 in which embodiments can be implemented. Communication system 100 includes a client browser 110 that is communicatively coupled to server devices 120 and 130 via a network 140. Although system 100 is described herein with reference to one client browser and two servers, one of skill in the art will recognize that system 100 may also include more than one client browser and fewer than or more than two servers.

Web browsers are software applications that allow a user to view or download content that is available on a network, such as on a website on the World Wide Web. Content may include text, files, images, audio, video and personal communications. Web pages present such content and are located using uniform resource identifiers (URI) such as a uniform resource locator (URL). Web pages may be retrieved using the Internet Protocol (IP) address of the computer holding the web page content.

Browsers may use a number of protocols and standards to obtain or manage content flow. Most browsers primarily use hypertext transfer protocol (HTTP) to fetch content and web pages. HTTP is an application-level protocol providing basic request/response semantics. HTTP can be used for requesting and retrieving objects from a server.

Server 120 or server 130 can be, for example, and without limitation, a telecommunications server, a web server, or other type of database server. A web server may contain web applications which generate content in response to an HTTP request. The web server packages the generated content and serves the content to a client in the form of an HTTP response. A web server is a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, or any combination thereof. This example is strictly illustrative and does not limit the scope of the present disclosure.

Client browser 110 can run on any computing device. Similarly, servers 120 and 130 can be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

Network 140 can be any network or combination of networks that can carry data communication, and may be referred to herein as a computer network. Such network 140 can include, but is not limited to, a wired (e.g., Ethernet) or a wireless (e.g., Wi-Fi or 3G) network, a local area network, medium area network, and/or wide area network such as the Internet. Network 140 can support protocols and technology including, but not limited to, World Wide Web protocols and/or services. Intermediate web servers, gateways, or other servers may be provided between components of communication system 100 depending upon a particular application or environment.

In FIG. 1, client browser 110 may send an HTTP request to server 120, such as a request for a web page, over network 140. Server 120 receives the HTTP request and returns an HTTP response, such as content for the requested web page. When client browser 110 receives the web page, client browser 110 can render the web page for a user.

A web page may contain resources that refer to subresources. A subresource may be a resource referred by that resource or another resource. A display of a web page may be delayed as an outer frame is acquired which in turn may require subresources such as imagery or additional pages.

Acquiring top-level content of a web page may incur three round-trips for each acquired resource. A first round-trip can occur when a DNS lookup is performed. A second round-trip can occur when a connection is established with a server. A third round-trip can occur when web content is acquired. When a web page is retrieved, a user may experience an unsatisfactory period of delay. A user's experience in surfing the Web may be more enjoyable when web page load time is reduced.

Exemplary methods, systems, and computer program products may provide for adaptation and speculation when a web page is requested (e.g., a first time or numerous times). In some embodiments, a client application such as client browser 110 may adaptively learn and speculate that contacts to a first URL hostname, such as a web page fetch, may typically be followed by additional connections to the first URL hostname, a second URL hostname, or both. In one embodiment, client browser 110 uses speculative information to instigate one or more preconnections to a URL hostname.

Preconnecting to a hostname may reduce the latency of content acquisition. Latency can be reduced by overlapping a connection time for a subresource with a connection and acquisition time of a containing resource before it is certain that the connection to acquire the subresource will be used.

In some embodiments, a client browser initiates a connection to a first URL hostname. Client browser 110 may have records suggesting that a connection to a second URL hostname was previously useful in acquiring subresources for content acquired by the first URL. Client browser 110 may obtain speculative information associated with the first URL hostname that includes a likelihood of connecting to a second URL hostname as a result of initiating a connection to the first URL hostname. Client browser 110 may determine whether to preconnect to the second URL hostname based on speculative information. If a determination to preconnect is made, client browser 110 provides an instruction to preconnect to the second URL hostname.

III. Exemplary Client Browser

FIG. 2 shows a block diagram of an exemplary computer system 200. Computer system 200 includes client browser 110, which can communicate over network 140. Client browser 110 includes an adaptive-speculative preconnection system 210, connector 220, and preconnector 230. Adaptive-speculative preconnection system 210 obtains and processes speculative information. As shown in FIG. 2, adaptive-speculative preconnection system 210 includes an adapter 240, a speculator 250, and a speculative database 260. Adapter 240 and speculator 250 are coupled to speculative database 260.

A. Connections

When a user navigates to a web page associated with a first URL hostname, connector 220 initiates a connection to the first URL hostname. Initiating a connection may include performing a DNS lookup, establishing a connection setup, sending a message, or any combination thereof.

B. Adaptive-Speculative Preconnection System

Adapter 240 obtains speculative information regarding future predictions of opening a connection to a second URL hostname based on initiating a connection to a first URL hostname. In one embodiment, a prediction may include an expectation of opening a connection to a second URL hostname. In another embodiment, a prediction may include a number of expected connections that will be opened to a second URL hostname. Adapter 240 can obtain speculative information from different sources.

1. Speculative Information May Be Obtained

In some embodiments, adapter 240 obtains speculative information by monitoring requests for content, observing actual connections that were made, or a combination thereof. Adapter 240 may monitor web sites visited by a user and learn user patterns and preferences. Web pages may contain subresources. Adapter 240 monitors a causal relationship between a subresource and a containing page or frame that referred the subresource. For example, adapter 240 may determine which resource referred a subresource. In one embodiment, a subresource has a field that stores information such as which resource referred the subresource. In one embodiment, adapter 240 monitors the referrer header field to determine which requests are requests for subresources.

Adapter 240 stores data, such as relationship information, in speculative database 260 based on its observations. In one example, adapter 240 observes requests made for a subresource from a containing resource and stores this information in speculative database 260. In another example, adapter 240 observes how many connections were made to acquire subresources from a second URL hostname due to content in a containing resource and stores this information in speculative database 260.

In some embodiments, adapter 240 obtains speculative information from server 120 over network 140. Adapter 240 may obtain speculative information from a remote site (e.g., third party). A third party may supply estimates of a likelihood of connecting to a second hostname as a result of initiating a connection to a first URL hostname or to a first URL hostname in addition to some or all parts of the first URL path or query string. In one example, a third party can observe activity from client browser 110, and send speculative information to client browser 110 or to another client browser. A remote server may supply a probability of connecting to a second host as a consequence of acquiring content from a first host. In another example, a remote server may supply estimates of a number of connections needed to a secondary host as a consequence of acquiring content from a first host. When adapter 240 obtains speculative information from the third party, speculative information is stored in speculative database 260.

Speculator 250 consults speculative database 260 when speculator 250 observes a connection being initiated to a first URL hostname. Speculator 250 speculates whether a connection to a second URL hostname will be established in the near future. Speculator 250 uses speculative information associated with the first URL hostname along with other information to determine whether to preconnect to the second URL hostname. In one embodiment, a first URL hostname and a second URL hostname have a common domain name. In another embodiment, a first URL hostname and a second URL hostname have different domain names. If speculator 250 provides an instruction to preconnect to a hostname, preconnector 230 initiates a preconnection to the hostname before a connection to the hostname is certain. This enables content to be acquired faster if it is requested from the hostname.

2. Speculative Information May be Based on Estimates

Speculative information may include information such as estimates of a likelihood of connecting to a hostname. In one embodiment, speculative information includes a probability of connecting to a second URL hostname based on a user navigating to a first URL hostname. If a probability of connecting to a second URL hostname is greater than or equal to a threshold amount, speculator 250 provides an instruction to preconnect to the second URL hostname. For example, speculator 250 may consult speculative database 260 and find that there is a very high likelihood that as a result of navigating to a first URL hostname, a connection to a second URL hostname will be established in the near future. Speculator 250 can provide instructions to preconnect to the second URL hostname. If a probability is less than a threshold amount, speculator 250 does not provide an instruction to preconnect to the hostname.

In another embodiment, speculative information includes an expected number of connections that may be used to acquire resources from a second URL hostname based on a user navigating to a first URL hostname. If an expected number of connections is greater than or equal to a threshold amount, speculator 250 provides an instruction to preconnect to the hostname. If an expected number of connections is less than a threshold amount, speculator 250 does not provide an instruction to preconnect to the hostname.

Based on the number of expected connections, speculator 250 may provide at least one instruction to establish at least one preconnection to at least one hostname. The larger the number of expected connections, the more preconnections that may occur. This may be limited, for example, by the maximum number of connections possible for client browser 110. Client browser 110 may have a maximum number of connections that it can open (e.g., to a single hostname or to multiple hostnames) at any one time. In one embodiment, if an estimated number of useful connections exceeds the maximum number of connections that can be opened at any one time, the maximum number of connections that can be opened are opened. In one example, if the maximum number of connections client browser 110 can open at one time is six, when a user navigates to a web page that is expected to have ten connections, six preconnections are opened. The number of preconnections may depend on other factors such as the processing power and resources of client browser 110. In one example, the maximum number of preconnections may not be opened if it would significantly slow down the client.

In another embodiment, vectors of state are used to estimate a likelihood of connecting to a hostname. In one example, a probability of connecting to a hostname and an expected number of connections to the hostname may be used to determine whether to preconnect to the hostname.

In some embodiments, speculative information may be based on a variety of factors such as observed content requests and connections, historical estimates, remote-site estimates, current estimates, or any combination thereof. Other factors can be used, as would be known to a person of skill in the relevant art.

In one embodiment, an expected number of connections to a hostname is based on a combination of historical data and current data. In another embodiment, an expected number of connections to a hostname is based on an aggregation of remote-site estimates and adaptive estimates to obtain a final estimate. A remote-site estimate may be used as an initial estimate, and updated based on observed results.

Values used to obtain estimates may be combined in various ways. In some embodiments, a weight may be assigned to previous estimates and a number of connections based on the most recent observation. In one embodiment, a weighted average can be taken of estimated values and used as an ongoing estimate.

For example, based on a connection to a first URL hostname, a first expected number of connections to a second URL hostname is 3.5 connections. If in a recent navigation to the first URL hostname, a second number of connections (e.g., 4 connections) is needed to the second URL hostname, the first estimate (e.g., 3.5 connections) and the second estimate (e.g., 4 connections) can be combined to form a new estimate.

In one example, a weight of 65% is assigned to a previous estimate (e.g., 3.5 connections) and a weight of 35% is assigned to a number of connections based on a most recent observation (e.g., 4 connections). An updated estimate may be 3.675 connections (0.65×3.5+0.35×4), and may be used as a new expected number of connections. When a user subsequently navigates to the first URL hostname, a second weighted average may be taken using the previous estimate (e.g., 3.675 connections) and the currently observed connection.

In another example, a weight of 0% is assigned to a previous estimate (e.g., 3.5 connections) and a weight of 100% is assigned to the currently observed connection (e.g., 4 connections). In this example, the number of connections used from the most recently observed navigation (e.g., 4 connections) is used as the expected number of connections.

Updating an estimated number of connections was discussed above. Based on the description herein, a person skilled in the relevant art will recognize that similar techniques of updating estimates may be used (e.g., to update a probability of connecting to a second hostname as a result of initiating a connection to a first hostname).

3. Speculative Information May Take Path Names into Consideration

In some embodiments, estimates for a subresource depend only on a hostname of a containing resource. For example, an estimate for a likelihood of establishing a connection to http://images.amazon.com may be maintained only for www.amazon.com, and aggregated across all observed paths of a hostname (e.g., http://www.amazon.com/products). In one embodiment, adapter 240 acknowledges only a hostname in a referring URL and ignores paths in the referring URL (e.g., in the referrer field). As a result, adapter 240 keeps track of less data, which may be easier to maintain and implement.

In some embodiments, estimates for a subresource depend on a hostname and part of a path of an observed URL. For example, an estimate for a likelihood of establishing a connection may be aggregated across a first URL hostname and part of a path of the first URL hostname. Separate estimates may be maintained for connections to http://images.facebook.com for distinct URLs (or URL prefixes) (e.g., http://www.facebook.com/alice and http://www.facebook.com/bob). A URL http://www.facebook.com/alice may have images from a first web site and a URL http://www.facebook.com/bob may have images from a second web site, different from the first web site. A likelihood of connecting to http://images.facebook.com may be different for http://www.facebook.com/alice compared with http://www.facebook.com/bob.

4. Automatic Preconnections to a Hostname

Web sites often acquire several resources from any domain visited. In one embodiment, an observed connection to a hostname is automatically doubled. For example, speculator 250 proceeds based on a speculation factor that all web sites visited will use two connections. When client browser 110 initiates a first connection to a first hostname, an instruction to preconnect to a second hostname is automatically provided. In this example, two connections may be established even if only one piece of content is acquired from the first hostname.

In another embodiment, at least three or more preconnections to a hostname are automatically provided.

C. Preconnections

Preconnector 230 initiates a preconnection to a hostname when an instruction to preconnect is provided. Preconnector 230 may not know for certain that a preconnection will ever be used until the content is actually requested. If there is a high probability of connecting to a second URL hostname when a user navigates to a first URL hostname, preconnector 230 initiates a preconnection to the second URL hostname.

Client browser 110 coordinates to acquire observed top-level content of a first hostname simultaneously, substantially at the same time, or in a parallel manner as client browser 110 preconnects to a second hostname. When a connection to a first URL hostname is initiated, one or more connections are made to a second URL hostname in parallel with an expectation that as soon as the first-level content is received, more resources will be requested. Preconnector 230 allows for an open preconnection that is ready to acquire content from a second URL hostname when content associated with a first URL hostname arrives. The total number of round-trips to render a web page may be reduced.

A preconnection may include performing preliminary acts that establish an actual connection. For example, in one embodiment, a preconnection includes performing a DNS lookup for a hostname. In another embodiment, a preconnection for a TCP/IP network connection includes transmitting a SYN packet to a server and receiving a SYN-ACK from the server. When a server sends a SYN-ACK to client browser 110, the server typically does not use a significant amount of computational resources. In this embodiment, preconnector 230 delays transmitting an ACK of the SYN-ACK to the server until client browser 110 is certain that a connection will take place. This allows the server to use its resources at a later point in time to service the request. Further, some servers terminate idle connections after some amount of inactivity. For example when resources are consumed, a server starts a timer that drops a connection if a request is not received from client browser 110 (e.g., an HTTP GET request) within a given timeframe. An advantage of delaying the sending of an ACK of the SYN-ACK to the server until a connection is certain prevents the preconnection from being dropped after it is established. Further, if a server does not reserve memory for a buffer for inbound data until the server receives the ACK of the SYN-ACK from preconnector 230, network congestion may be decreased, which prevents other users from experiencing a long delay for requests.

In another embodiment, a preconnection includes transmitting a SYN packet to a server, receiving a SYN-ACK from the server, and transmitting an ACK to the server in response to the SYN-ACK.

In another embodiment, a preconnection further includes performing an actual use of a connection after it is established. For example, in an HTTP web connection, a preconnection may include transmitting an HTTP request (e.g., GET request). The HTTP request may be a valid request or a dummy request to warm up the server.

In another embodiment, a preconnection includes performing negotiations for a secure connection to a hostname. A secure preconnection may be made simultaneously, substantially at the same time, or in a parallel manner as other preconnections. Opening a secure preconnection to a hostname incurs at least four round-trips—performing a DNS lookup, setting up a preconnection, establishing a session key, and responding to messages. Additional round-trips may be incurred. Preconnecting over the interne with a secure connection uses resources both at a client and a server, and may entail a lot of cryptographic work. To help ease the burden of establishing a secure connection, a session key can be shared across multiple secure preconnections.

In some embodiments, one or more secure connections can be opened and a session key shared across one or more secure connections. In one example, if a user navigates to a web site that contains images estimated to use four secure connections, adaptive-speculative preconnection system 210 opens four secure preconnections to the web site. A DNS lookup and a connection setup can be performed for all four connections simultaneously, substantially at the same time, or in a parallel manner. Additionally, for one secure preconnection, a session key can be established and agreed upon. Once established, a session key may be reused across one or more secure preconnections.

In one embodiment, a secure connection is an SSL connection. Other security protocols can also be used to establish secure connections.

In one embodiment, system 200 may be configured to handle HTTP. In another embodiment, system 200 may be configured to handle other protocols involved in interne or network communication. In one embodiment, adaptive speculative preconnection system 210 is a browser plug-in that adds functionality to client browser 110. In another embodiment, adaptive-speculative preconnection system 210 is native to client browser 110.

As shown in FIG. 2, adaptive-speculative preconnection system 210 includes adapter 240, speculator 250, and speculative database 260. Adaptive-speculative preconnection system 210 can have more or less than the components shown.

Various aspects of embodiments described herein can be implemented by software, firmware, hardware, or a combination thereof. The embodiments, or portions thereof, can be implemented as computer-readable code. For example, adapter 240, speculator 250, connector 220, or preconnector 230 may be implemented in a computer system using software, firmware, hardware, tangible computer-readable media having instructions stored thereon, or a combination thereof and may be implemented in one or more computer systems or other processing systems.

Further, adapter 240, speculator 250, connector 220, or preconnector 230 can be implemented using a processor (e.g., dual processor or spread across multiple machines). The processor can be a special purpose or a general purpose processor. The processor can be connected to a communication infrastructure (for example, a bus or network). Software, firmware, hardware, or any combination thereof may embody any of the components in FIGS. 1 and 2.

Further, in alternative embodiments, any subset of the components shown in FIG. 2 may in fact be embodied as a single component. In one example, the functionality of adapter 240 and speculator 250 is combined in a single device or module. In another example, functionality of connector 220 and preconnector 230 is combined in a single device or module. Other combinations of the functional components of FIG. 2 are also possible, as would be known to a person of skill in the art.

IV. Exemplary Table in Speculative Database

FIG. 3 shows an exemplary table 300 in a speculative database. In FIG. 3, table 300 has six columns, and shows information such as statistics regarding content requests, connections made in response to content requests, and speculative information. A first column "Host for Page" lists a host for a parent or containing page. When a user requests resources from a page, an entry listing an address of the page is inserted into table 300. A second column "Page Load Count" lists how many times a user has visited the page listed in the first column. This can be for a current session or persisted across multiple sessions. Adapter 240 stores what it learns from session to session so that the state is persisted.

A third column "Subresource Navigations" lists how many times a subresource (e.g., a subresource in the far right column) has been requested. A fourth column "Subresource Preconnects" lists how many times a preconnection to a hostname to acquire a particular subresource has occurred. A fifth column "Expected Connects" lists an expected number of connections that will be made to a hostname to a acquire a particular subresource. An expected number of connections may be useful to determine how many preconnections to make in advance. A sixth column "Subresource Spec" lists subresources that may be contained in the containing page. More than one subresource can be listed in the sixth column for each containing page.

Learned and speculative information may be persisted across browser sessions. As a user continues to navigate through web pages, data in table 300 may change. For example, the next time a user navigates to http://www.cnn.com, an expected number of connections may increase or decrease, depending on such factors as how many and which subresources were observed in the most recent request.

Data in table 300 may become stale after a while. For example, a user can navigate to a web page once and subsequently not visit the web page for months or ever again. It may be useful to keep data in table 300 abreast of a user's navigation patterns and preferences. In one embodiment, when client browser 110 is shut down and restarted, an estimate of the likelihood of connecting to a hostname is reduced. If an estimate reaches a value below a threshold value, which indicates an unlikely connection, an applicable entry may be deleted from table 300. In one embodiment, an expected number of connections may be divided by 2 each time client browser 110 is shut down and restarted. Other mathematical operations or formulas can be applied to modify values in table 300, as would be known to a person of skill in the relevant art. An updating of table 300 can be performed by adapter 240, speculator 230, or another component.

Embodiments of table 300 may include more or less columns or information than that shown in FIG. 3. In one example, table 300 may include a column (e.g., "Probability of Connecting to the Second URL Hostname") that shows the probability of connecting to a second hostname as a result of navigating to a first hostname. In another example, table 300 may include a column (e.g., "Subresource DNS Preresolutions") that lists how many times a DNS preresolution has been performed for a resource.

V. Exemplary Method

Figure 4:
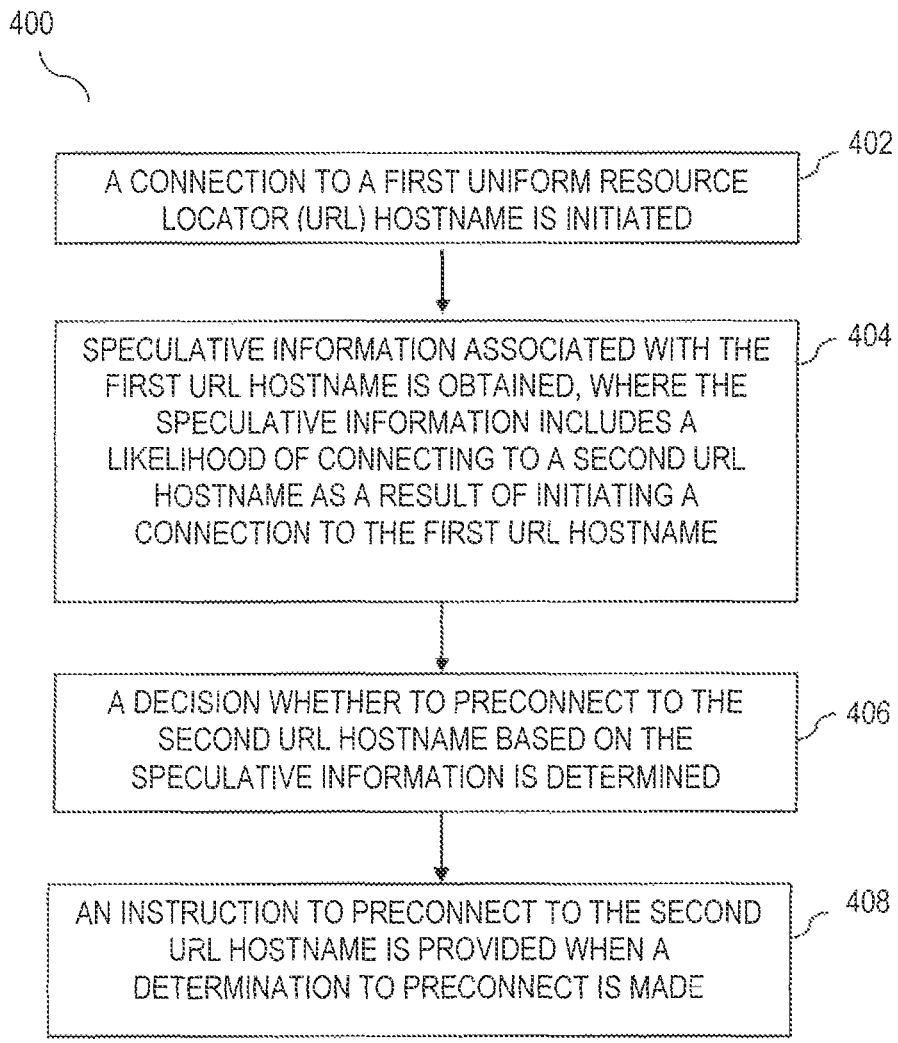
FIG. 4 shows a flowchart of an exemplary method for reducing web page load time using adaptive speculative preconnection.

FIG. 4 shows a flowchart of exemplary method 400 for reducing web page load time using adaptive-speculative preconnection. While method 400 is described with respect to one embodiment, method 400 is not meant to be limiting and may be used in other applications. Method 400 may be used to reduce web page load time using adaptive-speculative preconnection, like system 200 of FIG. 2. However, method 400 is not meant to be limited to system 200.

At a stage 402, a connection to a first URL hostname is initiated. In some embodiments, connector 220 initiates a connection to a first URL hostname. At a stage 404, speculative information associated with the first URL hostname is obtained. Speculative information may include a likelihood of connecting to a second URL hostname as a result of the initiated connection to the first URL hostname. In some embodiments, adapter 240 obtains speculative information.

At a stage 406, a decision whether to preconnect to the second URL hostname based on the speculative information is determined. In some embodiments, speculator 250 determines whether to preconnect to the second URL hostname. At a stage 408, an instruction to preconnect to the second URL hostname is provided when a determination to preconnect is made. In some embodiments, speculator 250 provides an instruction to preconnect to the second URL hostname when a determination to preconnect is made. Stages 402-408 may be implemented as software, hardware, firmware, or any combination thereof.

Operations for the above-described embodiments may be further described with reference to one or more logic flows. It will be appreciated that the representative logic flows do not necessarily have to be executed in the order presented or in any particular order. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

CONCLUSION

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A computing device-implemented method for reducing web page load time comprising:
    initiating a connection to a first uniform resource locator (URL) host;
    obtaining speculative information associated with the first URL host, wherein the speculative information comprises a likelihood of connecting to a second URL host as a result of initiating a connection to the first URL host;
    determining, using a computing device, whether to preconnect to the second URL host based on the speculative information;
    providing an instruction to preconnect to the second URL host when a determination to preconnect is made; and
    preconnecting to the second URL host to establish a preconnection when an instruction to preconnect is provided, wherein the preconnecting comprises:
        transmitting a synchronization (SYN) packet to the second URL host;
        receiving an acknowledgement (ACK) packet in response to the transmitting the SYN packet; and
        waiting for an instruction to load content located at the second URL host before transmitting a content request to the second URL host using the preconnection, wherein the preconnection is ready to acquire content from the second URL host when content associated with the first URL host is received over the connection.

2. The method of claim 1, wherein the first URL host and the second URL host have a common domain name.

3. The method of claim 1, wherein the first URL host has a domain name different from the second URL host.

4. The method of claim 1, wherein initiating a connection to a first URL host comprises automatically providing an instruction to preconnect to the second URL host.

5. The method of claim 1, wherein obtaining speculative information comprises receiving the speculative information from a remote site.

6. The method of claim 1, wherein obtaining speculative information comprises obtaining a probability of connecting to the second URL host, an estimate of a number of connections needed to acquire all required subresources of the second URL host, or vectors of state.

7. The method of claim 1, wherein obtaining speculative information comprises consulting a speculative database, the method further comprising:
    monitoring requests for resources associated with URL hosts;
    estimating the likelihood of connecting to the second URL host based on the monitoring, wherein the likelihood comprises a probability of connecting to the second URL host, an estimate of a number of connections needed to acquire all required subresources of the second URL host, or vectors of state; and
    storing a result of the estimating in the speculative database.

8. The method of claim 7, further comprising:
    updating an estimate of the likelihood of connecting to the second URL host, wherein the updating comprises reducing the estimate by dividing the estimate by a number; and
    storing a result of the updating in the speculative database.

9. The method of claim 7, wherein the estimating is based at least in part on at least one of historical estimates, remote site estimates, and the monitoring.

10. The method of claim 7, wherein the estimating depends on the hostname of the first URL host and the estimating is aggregated across all observed paths of the first URL host.

11. The method of claim 7, wherein the estimating depends on a hostname and part of a path of the first URL hostname and the estimating is aggregated across the first URL hostname and part of the path of the first URL hostname.

12. The method of claim 1, wherein the preconnecting further comprises transmitting an ACK in response to the receiving an acknowledgement.

13. The method of claim 1, wherein initiating a connection to a first URL host comprises performing a Domain Name System (DNS) lookup, connecting to the first URL host, and acquiring content associated with the first URL host such that the initiating a connection to a first URL host occurs during a time period that overlaps with preconnecting to the second URL host.

14. The method of claim 1, wherein initiating a connection to a first URL host comprises initiating a secure connection, the method further comprising:
    receiving a session key for the secure connection to the first URL host; and
    using the session key to communicate with the second URL host.

15. A system for reducing web page load time comprising:
    a connector, implemented with a computing device, to initiate a connection to a first uniform resource locator (URL) host;
    an adapter configured to obtain speculative information associated with the first URL host, wherein the speculative information comprises a likelihood of connecting to a second URL host as a result of initiating a connection to the first URL host; and
    a speculator configured to determine whether to preconnect to the second URL host based on the speculative information, and provide an instruction to preconnect to the second URL hostname when a determination to preconnect is made;

a preconnector configured to preconnect to the second URL host to establish a preconnection when an instruction to preconnect to the second URL host is provided, wherein the preconnector transmits a synchronization (SYN) packet, receives an acknowledgement (ACK) packet in response to transmitting the SYN packet, and waits for an instruction to load content located at the second URL host before transmitting a content request to the second URL host using the preconnection, wherein the preconnection is ready to acquire content from the second URL host when content associated with the first URL host is received over the connection.

16. The system of claim 15, further comprising:

a request monitor, implemented with a computing device, to monitor requests for resources associated with URL hosts; and the speculator further configured to estimate the likelihood of connecting to the second URL host based on the monitoring, wherein the likelihood comprises a probability of connecting to the second URL host, an estimate of a number of connections needed to acquire all required subresources of the second URL host, or vectors of state, and store a result of the estimate in the speculative database.

17. The system of claim 16, wherein when the speculator estimates a likelihood of connecting to the second URL host, the speculator is based at least in part on at least one of historical estimates, remote site estimates, and the monitoring.

18. The system of claim 15, wherein when the adapter obtains the speculative information, the adapter obtains a probability of connecting to the second URL host, an estimate of a number of connections needed to acquire all required subresources of the second URL host, or vectors of state.

19. The system of claim 15, wherein when the connector initiates a connection to the first URL host, the connector performs a Domain Name System (DNS) lookup, connects to the first URL host, and acquires content associated with the first URL host such that initiating the connection to the first URL host occurs during a time period that overlaps when the preconnector preconnects to the second URL host.

20. The system of claim 15, wherein the connector initiates a secure connection to the first URL host and receives a session key for the secure connection to the first URL host, and the session key is used to communicate with the second URL host.

21. A non-transitory computer-program product comprising a computer-usable medium having computer program logic recorded thereon for enabling a processor to reduce web page load time, the computer program logic comprising computer readable program code that enables a processor to perform operations to:

initiate a connection to a first uniform resource locator (URL) host;

to obtain speculative information associated with the first URL host, wherein the speculative information comprises a likelihood of connecting to a second URL host as a result of initiating the connection to the first URL host;

determine whether to preconnect to the second URL host based on the speculative information;

provide an instruction to preconnect to the second URL host when a determination to preconnect to the second URL host is made; and preconnect to the second URL host to establish a preconnection when an instruction to preconnect is provided, wherein the preconnect comprises operations to:

transmit a synchronization (SYN) packet to the second URL host;

receive an acknowledgement (ACK) packet in response to transmission of the SYN packet; and wait for an instruction to load content located at the second URL host before transmitting a content request to the second URL host using the preconnection, wherein the preconnection is ready to acquire content from the second URL host when content associated with the first URL host is received over the connection.

22. The non-transitory computer program product of claim 21, further comprising operations to:

monitor requests for resources associated with URL hosts;

estimate the likelihood of connecting to the second URL host based on the monitoring, wherein the likelihood comprises a probability of connecting to the second URL host, an estimate of a number of connections needed to acquire all required subresources of the second URL host, or vectors of state; and store a result of the estimating in the speculative database.

23. The non-transitory computer program product of claim 21, wherein the preconnect includes operations to perform a DNS lookup, connect to the first URL host, and acquire content associated with the first URL host, wherein the initiating the connection to the first URL host occurs during a time period that overlaps with preconnecting to the second URL host.

* * * * *

UNITED STATES PATENT AND TRADEMARK OFFICE
CERTIFICATE OF CORRECTION

PATENT NO. : 9,083,583 B1  
APPLICATION NO. : 13/175715  
DATED : July 14, 2015  
INVENTOR(S) : Roskind et al.

Page 1 of 1

It is certified that error appears in the above-identified patent and that said Letters Patent is hereby corrected as shown below:

On the title page,

In item 57, lines 5, 6, 8, 9, 11, and 14. Please replace "hostname" with --host--.

In the claims,

In column 12, line 38. Please replace the second recitation of "hostname" with --host--.

In column 12, lines 39 and 40. Please replace "hostname" with --host--.

In column 13, line 4. Please replace "hostname" with --host--.

Signed and Sealed this
Twenty-second Day of December, 2015

Michelle K. Lee
*Director of the United States Patent and Trademark Office*